May 14, 1935.  L. M. HARVEY  2,001,420
AUXILIARY WINDSHIELD FOR MOTOR CARS
Filed April 18, 1932
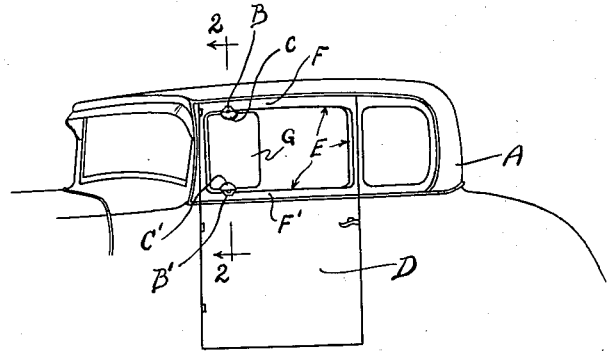
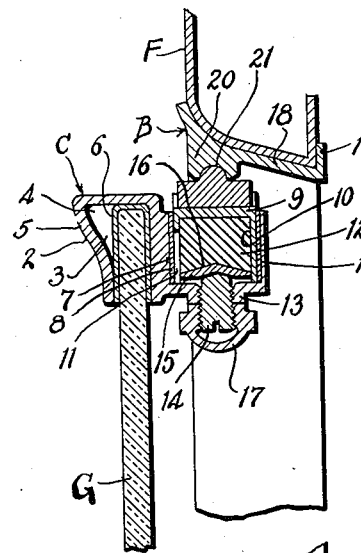
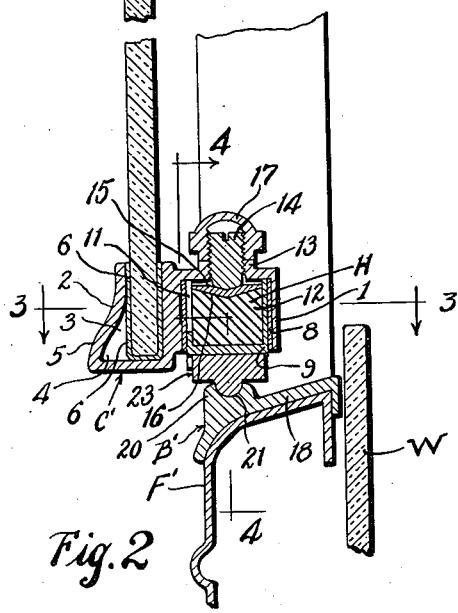
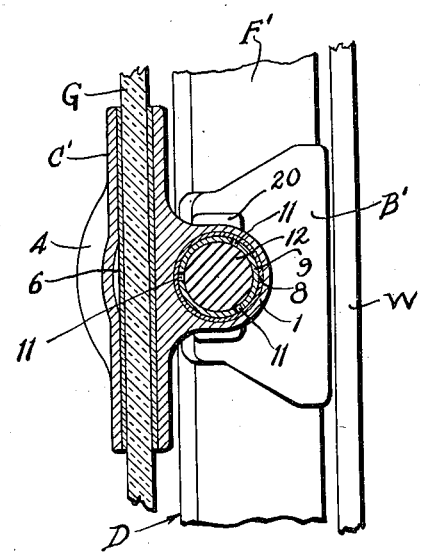
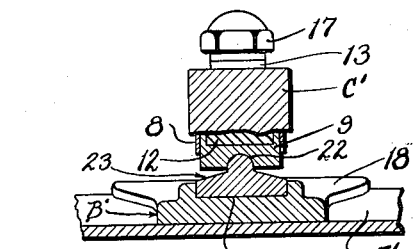
INVENTOR.
Leo M. Harvey
BY
ATTORNEYS.

Patented May 14, 1935

2,001,420

UNITED STATES PATENT OFFICE 2,001,420

AUXILIARY WINDSHIELD FOR MOTOR CARS

Leo M. Harvey, Los Angeles, Calif.

Application April 18, 1932, Serial No. 605,968

10 Claims. (Cl. 296—84)

This invention relates to auxiliary windshields for motor vehicles, and a particular object is to provide a windshield arranged to be demountably supported in the window opening of a door of a closed car which is bounded by reveals and frictionally held in position on said reveals so as to eliminate the necessity for attaching screws or the like, as in other types of windshields.

The invention contemplates the provision of brackets or pads which are adjustably attachable to the upper and lower rails or reveals of a window opening and a glass shield frictionally supporting on its upper and lower ends clamping members which have adjustable devices whereby the clamping members are frictionally engaged with said brackets so that when the glass is operatively positioned on a door and the clamping members tensioned against the brackets the brackets will be immovably held on the door frame and at the same time the windshield may be adjusted to any desired position.

Another object is to provide means associated with the clamping members and interposed between the clamping members and the supporting brackets for providing a universal movement of the assembled windshield relative to the door so as to compensate for the weaving of the door frame while the automobile is in motion, and also to permit of the ready operation and use of the windshield without accurately alining the supporting brackets on the door frame.

With the above and other objects in view, I have shown a preferred form of invention in the accompanying drawing, subject to modification within the scope of the appended claims without departing from the spirit thereof. In said drawing, Fig. 1 is a perspective view of a portion of a closed car with my improved windshield operatively mounted thereon.

Fig. 2 is an enlarged sectional elevation of the windshield and automobile door to which the shield is attached, as seen on line 2—2 of Fig. 1.

Fig. 3 is a sectional plan of the same on line 3—3 of Fig. 2.

Fig. 4 is a fragmentary sectional illustration of one of the clamping devices on line 4—4 of Fig. 2.

Fig. 5 is a perspective view of a knuckle adapted to be associated with each of the clamping devices and mounted between the clamping devices and the supporting brackets for providing universality of movement.

As shown in the accompanying drawing, my improved shield G is adapted to be operatively mounted in or adjacent the opening E in a door D of a closed type of automobile A, intermediate the frame members F and F' forming the upper and lower margins, respectively, of the door opening E.

Briefly, the invention includes a pair of supporting brackets, or pads B and B' demountably held respectively on the bottom of the upper frame member, or reveal, F and on the top of the lower frame or reveal member F', a glass shield G of suitable contour, and a pair of clamping members C and C' frictionally held on the upper and lower extremities of the glass G and provided with suitable adjusting devices H, H by means of which frictional engagement with the brackets B and B' respectively is accomplished, all as hereinafter described in detail.

It will be understood that the brackets B and B' are typical of each other, and that the members C and C' and H, H are also similar, as evidenced by the disclosure of the drawing. The members C and C' are provided with socket portions 1 extending inwardly from the glass G, and distorted U-shaped outer portions 2 which serve to receive and hold the glass G. The portions 2 have recesses 3 which may or may not be distorted and bulged outwardly at 4 from the outer face of glass G.

The outer flanges 5 of the clamps C and C' are respectively thin and are adapted to yield slightly so that when the glass G is inserted in the recesses 3 of the clamps with an intermediate felt or rubber cushion 6 overlapping its opposite ends, the inherent tension of the flanges 5 will serve to frictionally hold the clamps C and C' on the glass against displacement from their proper positions. Associated with the socket portions 1, I provide means for stressing the brackets B, B' and for frictionally pivoting the windshield on the axes of the socket portions. The means for this purpose will now be described. The socket portions 1 of the clamps are bored at 7 to form cylindrical sockets which are open at the upper end of clamp C and at the lower end of clamp C'.

Each of the bores 7 is preferably provided with a fiber sleeve 8 which is tightly pressed into position. An attaching device is associated with each sleeve, preferably including a barrel 9 which is frictionally held within the sleeve 8 in each case, and this barrel is of cylindrical cross section with an enlarged bore 10 open at one end and closed at the other. The barrel is expansible. For this purpose the relatively thin wall of the barrel 9 has a plurality of slits 11 formed therein and the bore 10 in each case is filled with a plug 12 of resilient material, such as rubber. The closed ends of the sockets 1 are provided with outwardly turned necks 13 which are internally threaded to receive adjusting screws 14 having their inner ends preferably of conical form and adapted to engage metal washers 15.

It will be observed by reference to Fig. 2 that the adjacent ends of the rubber plugs 12 have conical depressions 16 therein and that the washers 15 are of conical form, fitting said depressions and also fitting the inner ends of the screws 14. Thus, as the screws 14 are turned in a given direction the washers 15 are forced inwardly into the barrels 9, thereby compressing the plugs 12 and springing the slit wall of the barrels outwardly so as to frictionally engage the inner periphery of the fiber sleeves 8. At the same time, however, the barrels 9 are forced upwardly in clamp C and downwardly in clamp C' for purposes which will be hereinafter described.

The extended ends of the screws 14 are enclosed by cap nuts 17 which also serve to lock the screws 14 in adjusted positions. The brackets or pads B and B' have body portions 18 which overlie the outwardly sloping rails F and F' of the door opening and flanges 19 which extend upwardly and downwardly respectively into the slots at the margins of the opening usually provided for receiving the door window W. The flanges 19 prevent the displacement of the pads when pressure is applied thereto for frictionally holding the shield G in position. Lugs 20 are provided on the brackets B and B' which are turned downwardly and upwardly respectively and have longitudinal grooves 21 formed therein which are closed at their ends, as shown in Fig. 4. The barrels 9 have similar but relatively right angular grooves 22 provided on their outer ends whereby knuckles 23 may be interposed between the brackets and the barrels and the grooves 22 may also be closed at their ends. Said knuckles have longitudinal members 24 adapted to rock in the grooves 21 of the brackets B and B' and transverse members 25 adapted to rock in the grooves 22 of the barrels, thus providing universal joints to permit universal movement between the members B and C, and B' and C'. The knuckles are prevented from displacement from the grooves 21 and 22 by reason of the fact that the grooves are closed at their ends.

Each of the windshields embodying the structure I have hereinbefore described is first assembled with the clamps C and C' thereon in vertical alinement at points intermediate the opposite edges. The screws 14 are then retracted so that the barrels 9 may recede into the socket portions 1 sufficiently to position the knuckles 24 intermediate the members B and C and B' and C'. The supporting brackets or pads B and B' are then approximately alined vertically at the top and bottom of the window opening E and the glass G with the clamps C and C' and the adjusting devices H already mounted thereon are moved into position adjacent the brackets B and B'. The screws 14 are then tightened, thereby extending the barrels 9 for operatively and frictionally engaging the knuckles 23 with the brackets B and B'. The screws 14 are tightened sufficiently to hold the brackets B and B' firmly in position against displacement by accident or during use, and moreover the tightening of the screws serves to frictionally mount the glass G on said brackets.

It will be apparent that the barrels 9 when expanded into frictional engagement with the stationarily held sleeves 8, or in the absence of the sleeve with the bore 7, will prevent the ordinary displacement of the glass G from selected positions under ordinary conditions but will yet permit the pivotal movement of said glass on the axes of said barrels at will.

From the foregoing description it will be obvious that I have provided a simple, effective and economical windshield which is attachable in position on any type of closed car without marring the appearance of the car by unsightly screw holes, and the windshield may be quickly and securely mounted in position for use merely by tightening the screws 14, or may be removed from a car by loosening said screws.

Thus, I have provided in connection with a window opening bounded by outwardly sloping reveals F and F' a transparent shield G and means for frictionally and adjustably supporting said shield including the members C and C' attached to the shield, the brackets or pads B and B' frictionally connected to the top and bottom reveals F and F', respectively, in such a manner that the weight of the shield will be carried by the lower reveal, by means of the interconnection of the adjustable connections between the members C and C' with the pads B and B', respectively. When thus mounted, the shield G is adjustable to different wind deflecting positions in the window opening. The adjusting of the clamping devices serves to adjust one of the pads, B or B', toward or away from the other so as to bring the pads into engagement with the reveals F and F'.

The pads B and B' being provided with the flanges 19, when the clamping devices C and C' are adjusted a spreading pressure is applied to the oppositely mounted brackets for holding the same tightly against the upper and lower reveals and simultaneously an outward pressure is applied to the pads B and B' which causes the flange 19 to tightly engage the vertical faces of the frame, thereby preventing the displacement of the pads from the sloping reveals on which they are mounted.

What I claim is:

1. A windshield comprising a shield, clamps mounted on opposite extremities of said shield, a pair of brackets frictionally attachable to opposite portions of a supporting member, and adjustable attaching devices frictionally connecting said clamps with said brackets respectively, said attaching devices including means for stressing said brackets and holding the same in operative position and additionally holding said shield in adjusted positions for use, said clamps provided with sockets, said attaching devices including expansible barrels held in said sockets, and means for adjusting said barrels to vary the friction between said clamps and said brackets.

2. A windshield comprising a shield, clamps mounted on opposite extremities of said shield, a pair of brackets frictionally attachable to opposite portions of a supporting member, attaching devices frictionally connecting said clamps with said brackets respectively, said attaching devices including means for stressing said brackets and holding the same in operative position and additionally holding said shield in adjusted positions for use, said clamps having sockets therein, barrels rotatably and expansibly mounted in said sockets, compressible plugs held in said barrels, and means adjustable in said sockets and engaging said plugs for compressing the plugs and expanding the barrels to vary the friction between said brackets and said clamps.

3. A windshield of the character described in claim 1, including means associated with and for locking said attaching devices in adjusted positions, and separable means interposed between said barrels and said brackets permitting the universal movement of said shield relative to said supporting member.

4. A windshield as characterized in claim 2, including separable means interposed between said barrels and said brackets permitting the universal movement of said shield relative to said supporting member.

5. An auxiliary windshield comprising in combination with a supporting member having an opening therein, a transparent windshield, a pair of clamping members frictionally mounted on opposite extremities of said shield and provided with axially alined sockets, expansible barrels rotatably and longitudinally adjustable in said sockets, knuckle joints mounted on and adapted to be rocked in a given direction on the outer ends of said barrels, a pair of brackets demountably and frictionally held in substantial alinement on opposite portions of said supporting member and provided with grooves thereon for receiving portions of said knuckle joints whereby said joints may be rocked on said brackets in a direction at right angles to the movement of said joints on said barrels, and means adjustable on said sockets for expanding said barrels to vary the friction between said clamps and said brackets and also to vary the rotative friction of said shield on said barrel.

6. An auxiliary windshield comprising in combination with a supporting member having an opening therein, a transparent windshield, a pair of clamping members frictionally mounted on opposite extremities of said shield and provided with axially alined sockets, expansible barrels rotatably and longitudinally adjustable in said sockets, knuckle joints mounted on and adapted to be rocked in a given direction on the outer ends of said barrels, a pair of brackets demountably and frictionally held in substantial alinement on opposite portions of said supporting member and provided with grooves thereon for receiving portions of said knuckle joints whereby said joints may be rocked on said brackets in a direction at right angles to the movement of said joints on said barrels, and means on said sockets for expanding said barrels to vary the friction between said clamps and said brackets and also to vary the rotative friction of said shield on said barrel, said means including compressible means mounted in said barrels and adjusting screws mounted in said sockets for compressing said means.

7. An auxiliary windshield comprising in combination with a supporting member having an opening therein, a transparent windshield, a pair of clamping members frictionally mounted on opposite extremities of said shield and provided with axially alined sockets, expansible barrels rotatably and longitudinally adjustable in said sockets, knuckle joints mounted on and adapted to be rocked in a given direction on the outer ends of said barrels, a pair of brackets demountably and frictionally held in substantial alinement on opposite portions of said supporting member and provided with grooves thereon for receiving portions of said knuckle joints whereby said joints may be rocked on said brackets in a direction at right angles to the movement of said joints on said barrels, and means adjustable on said sockets for expanding said barrels to vary the friction between said clamps and said brackets and also to vary the rotative friction of said shield on said barrel, said brackets having marginal portions overlying the adjacent portions of said supporting member to prevent the rotation of the brackets on the supporting member.

8. A windshield comprising a glass shield, a supporting member therefor having an opening, a pair of brackets held on the upper and lower margins of said opening and provided with grooves on their adjacent sides closed at their ends, attaching members held on said shield in registration with said brackets, said attaching members provided with frictionally adjustable elements having grooves formed thereon at right angles to the grooves in said brackets and closed at their ends, and knuckles having relatively right angular portions seating in the grooves of said brackets and of said adjustable elements to permit the universal adjustment of the shield relative to the supporting member.

9. A windshield comprising a shield, clamps mounted on opposite extremities of said shield, a pair of brackets frictionally adjustable on opposite portions of a supporting member, and attaching devices frictionally connecting said clamps with said brackets respectively, each of said attaching devices including means enabling the attaching device to rock on its adjacent clamp on an axis substantially parallel with the longitudinal axis of the clamp and means for tensioning and holding said brackets in operative position and additionally holding said shield in adjusted positions for use, and means interposed between said adjustable devices and said brackets to permit the self-adjustment of said shield in any direction to compensate for the mis-alinement of said brackets and said adjusting devices.

10. A windshield comprising a shield, clamps mounted on opposite extremities of said shield, a pair of brackets frictionally attachable to opposite portions of a supporting member, and adjustable attaching devices frictionally connecting said clamps with said brackets respectively, said attaching devices including means for stressing said brackets and holding the same in operative position and additionally holding said shield in adjusted positions for use, said clamps provided with sockets, said attaching devices including expansible barrels held in said sockets, means for adjusting said barrels to vary the friction between said clamps and said brackets, and means associated with said attaching devices for locking the same in adjusted positions.

LEO M. HARVEY.